United States Patent [19]

Sumal et al.

[11] Patent Number: 4,561,302
[45] Date of Patent: Dec. 31, 1985

[54] AIR FLOW RATE METER

[75] Inventors: Jaihind S. Sumal, Vaihingen; Heinz Gneiss, Ludwigsburg, both of Fed. Rep. of Germany

[73] Assignee: Robert Bosch GmbH, Stuttgart, Fed. Rep. of Germany

[21] Appl. No.: 608,823

[22] Filed: May 10, 1984

[30] Foreign Application Priority Data

Jul. 20, 1983 [DE] Fed. Rep. of Germany ....... 3326047

[51] Int. Cl.$^4$ ................................................. G01F 5/00
[52] U.S. Cl. .......................................... 73/202; 73/118
[58] Field of Search .......................... 73/202, 204, 118

[56] References Cited

U.S. PATENT DOCUMENTS

| | | | |
|---|---|---|---|
| 2,926,299 | 2/1960 | Rogoff | 73/204 |
| 3,246,515 | 4/1966 | Martino et al. | 73/204 |
| 3,354,717 | 11/1967 | Minnick | 73/204 |
| 4,264,961 | 4/1981 | Nishimura et al. | 73/204 |
| 4,304,128 | 12/1981 | Hafner et al. | 73/204 |

*Primary Examiner*—Herbert Goldstein
*Attorney, Agent, or Firm*—Edwin E. Greigg

[57] ABSTRACT

An air flow rate meter for ascertaining the mass of the air flowing through an intake tube of an internal combustion engine. The air flow rate meter includes a temperature-dependent measuring resistor, which as a resistance wire is stretched out in an aperture of a carrier body and is disposed, as is a reference resistor, as an element in a common electrical bridge circuit. The carrier body protrudes into a flow cross section through which the air flows, and the reference resistor is wound, in the form of a reference resistor wire, on a partial segment spaced apart from the aperture. A compensating resistor is disposed in the aperture upstream of the measuring resistor and spaced apart as far as possible from the reference resistor.

8 Claims, 6 Drawing Figures

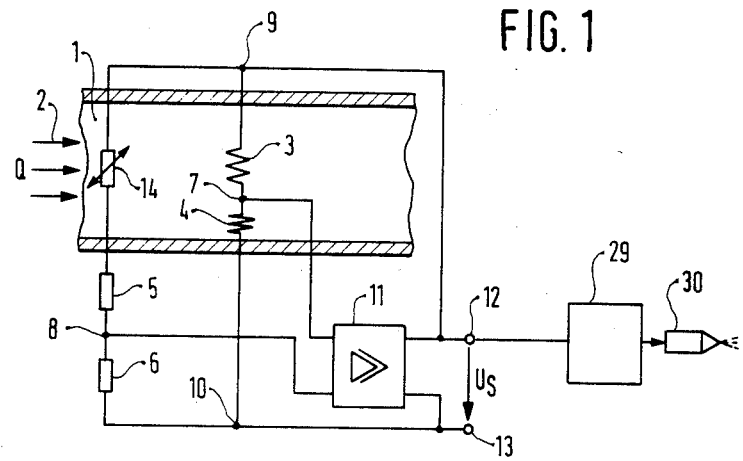
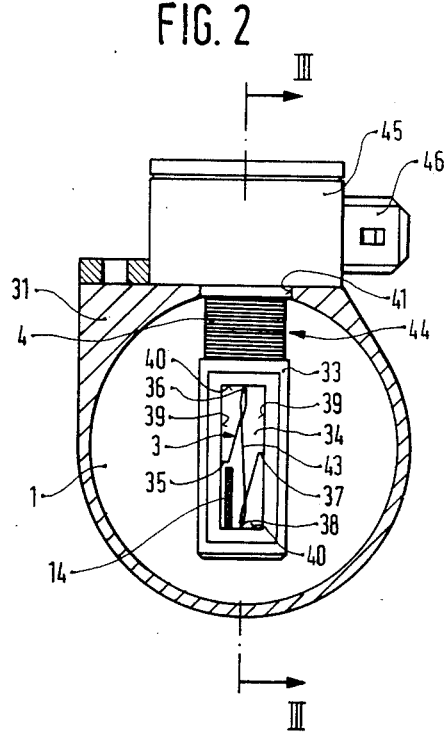
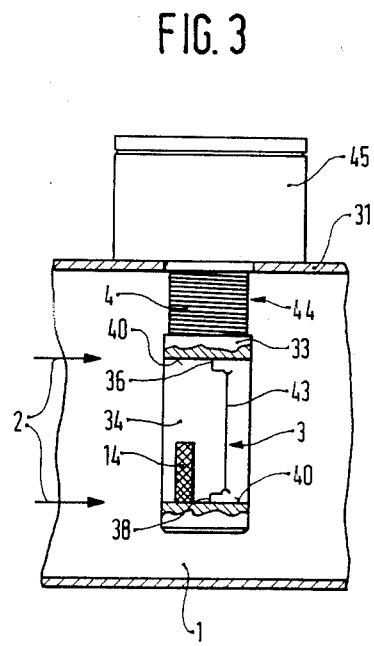

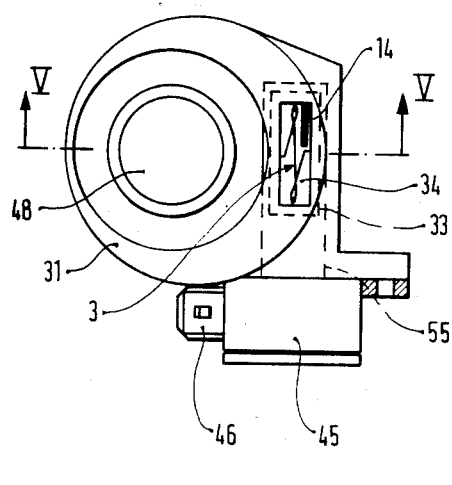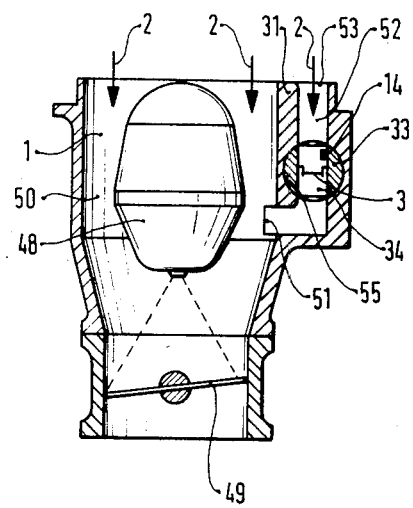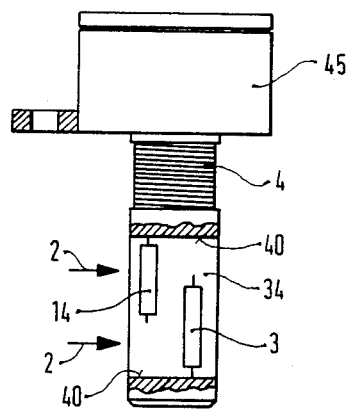

AIR FLOW RATE METER

BACKGROUND OF THE INVENTION

The invention is based on an air flow rate meter as generally defined hereinafter. An air flow rate meter of this general type is already known but this type of meter requires a very great amount of space, thereby not only causing undesirable disruptions in the flow but also having limited applicability.

OBJECT AND SUMMARY OF THE INVENTION

The air flow rate meter according to the invention has the advantage over the prior art in that it requires little space, so that although it is of a substantially similar embodiment the present air flow rate meter can be used for air flow rate measurement either directly in the air flow conduit or in a bypass thereto, while attaining the same desired accuracy in measurement.

It is particularly advantageous that the carrier body is inserted into a wall of an air flow conduit and penetrates through a bypass around the air flow conduit in such a way that the aperture extends in alignment with the bypass and in this vicinity determines the bypass cross section. A further advantageous feature is that the measuring resistor, embodied as a wire, is guided over support points at the individual sides of the aperture in such a manner that between the support points of the shorter sides of the aperture, a wire segment is formed that extends virtually in the direction of the longitudinal axis of the aperture. Still another advantage is attained by embodying the measuring resistor and the compensating resistor as film resistors.

The invention will be better understood and further objects and advantages thereof will become more apparent from the ensuring detailed description of preferred embodiments taken in conjunction with the drawings.

FIG. 1 is a wiring diagram of an air flow rate meter;

FIG. 2 shows a first exemplary embodiment of an air flow rate meter;

FIG. 3 is a section taken along the line III—III of FIG. 2;

FIG. 4 shows a second exemplary embodiment of an air flow rate meter;

FIG. 5 is a section taken along the line V—V of FIG. 4; and

FIG. 6 shows a third exemplary embodiment of an air flow rate meter.

DESCRIPTION OF THE PREFERRED EMBODIMENTS

In FIG. 1, a flow cross section 1 is shown, which by way of example may be an air intake tube of an internal combustion engine, not shown, through which a medium, such as the air aspirated by the engine, flows in the direction of the arrows 2. Located in the flow cross section 1, for instance as part of a flow rate measuring device, is a temperature-dependent measuring resistor 3, such as a hot wire, which experiences the flow through it of the output variables of a regulator and simultaneously furnishes the input variables for the regulator. The temperature of the temperature-dependent measuring resistor 3 is regulated by the regulator to a fixed value, which is above the average temperature of the medium. If the flow rate increases, that is, if the mass of the medium flowing per unit of time and having a flow value of Q increases, the temperature-dependent measuring resistor 3 cools down to a more pronounced extent. This cooling is fed back to the input of the regulator, so that the regulator increases its output variable such that the fixed temperature value is again established at the temperature-dependent measuring resistor 3. The output variable of the regulator regulates the temperature of the temperature-dependent measuring resistor 3 appropriately, upon changes in the flow value Q of the medium, to the predetermined value and simultaneously represents a standard for the mass of the flowing medium, which in the form of the measured flow value $U_S$ may for example be supplied to a metering circuit of an internal combustion engine for adapting the required fuel mass to the mass of air aspirated per unit of time.

The temperature-dependent measuring resistor 3 is disposed in a resistance measuring circuit, such as a bridge circuit, and together with a reference resistor 4 forms a first bridge branch, with which a second bridge branch comprising the two fixed resistors 5 and 6 is connected in parallel. The pickup point 7 is located between the resistors 3 and 4, and the pickup point 8 is located between the resistors 5 and 6. The two bridge branches are connected in parallel at points 9 and 10. The diagonal voltage of the bridge appearing between points 7 and 8 is carried to the input of an amplifier 11, to the output terminals of which points 9 and 10 are connected, so that its output variable supplies the bridge with operating voltage or current. The measured flow rate value $U_S$ which acts simultaneously as the manipulated variable can be picked up between the terminals 12 and 13, as indicated in the drawing.

The temperature-dependent measuring resistor 3 is heated up by the current flowing through it up to a value at which the input voltage of the amplifier 11, that is, the bridge diagonal voltage, becomes zero or assumes a predetermined value. From the output of the amplifier 11, a specific current then flows into the bridge circuit. If the temperature of the temperature-dependent measuring resistor varies because of changes in the mass Q of the flowing medium, then the voltage at the bridge diagonal varies as well, and the amplifier 11 regulates the bridge supply voltage or current to a value at which the bridge is again balanced, or else is imbalanced in a predetermined manner. The output variable of the amplifier 11, that is, the manipulated variable $U_S$, like the current in the temperature-dependent measuring resistor, represents a measured flow rate value for the mass of flowing medium, for instance the mass of air aspirated by an internal combustion engine, and can be fed into an electronic control unit 29, which for instance triggers at least one fuel injection valve 30.

In order to compensate for the effect of the temperature of the medium on the result of measurement, it may be suitable for a second temperature-dependent, compensating resistor 14 experiencing the flow of the medium to be incorporated into the second bridge branch. The magnitude of the resistors 5, 6 and 14 should be selected such that the power loss of the temperature-dependent compensating resistor 14, which is generated by the branch current flowing through it, is so slight that the temperature of the compensating resistor 14 varies practically not at all with changes in the bridge voltage but instead always corresponds to the temperature of the medium flowing past it.

The reference resistor 4 is suitably likewise disposed in the flow cross section 1 or in a heat-conducting relationship with the flow conduit wall 31, so that the lost heat of the reference resistor 4 can be carried away by the flowing air or the flow conduit wall 31. To this end, the reference resistor 4, like the measuring resistor 3, can be disposed on a cylindrical carrier body 33, in accordance with the exemplary embodiment shown in FIGS. 2 and 3. As shown in FIG. 2, the air flows at right angles to the plane of the drawing and flows around the carrier body 33 which partially protrudes through an opening 41 of the flow conduit wall 31 into the flow cross section 1, or flows through a rectangular aperture 34 of the carrier body 33 that extends parallel to the flow direction 2, the measuring resistor 3 being supported in this carrier body 33 at support points, by way of example four in number, 35, 36, 37, 38. The ends of the wire-like measuring resistor 3 are connected with the support points 35, 37 on the longer sides 39 of the aperture 34, while the measuring resistor wire 3 is looped around the two middle support points 36, 38 on the shorter sides 40, and the wire segments that cross one another in forming these loops are soldered together at the intersection. The wire segment 43 formed between the support points 36, 38 extends virtually in the longitudinal axis of the aperture 34. The reference resistor 4 is embodied by a reference resistor wire 4, which is wound onto a partial segment 44, likewise protruding into the flow cross section 1, of the carrier body 33. The reference resistor 4 is disposed spaced apart from the aperture 34 on the carrier body 33. At the greatest possible distance from the reference resistor 4, the compensating resistor 14 measuring the temperature of the flowing air is disposed in the aperture 34 upstream of the measuring resistor 3, or in other words, as shown, in the vicinity of the shorter side 40 of the aperture 34 remote from the reference resistor 4. The end of the carrier body 33 remote from the aperture 34 is connected with a circuit housing 45, which is supported on the flow conduit wall 31 outside the flow cross section and has an electrical plug connection 46 for supplying current and emitting a signal.

In the exemplary embodiment shown in FIGS. 4 and 5, elements remaining the same and functioning the same as those described with respect to FIGS. 1-3 are identified by the same reference numerals. Thus a fuel injection valve 48, which by way of example is actuated electromagnetically, is disposed concentrically in an air intake fitting 31 downstream of an air filter (not shown) in such a manner that the ejected fuel passes in a conical shape into an opening gap at a throttle valve 49, which is disposed downstream of the fuel injection valve 48 in the flow cross section 1 formed by the air intake fitting 31. As a result of the lining of the fuel injection valve 48, a restricted segment 50 is formed on the air intake fitting 31, at the narrowest point of which the mouth 51 of a bypass line 52 around the restricted segment 50 is advantageously disposed. The beginning 53 of the bypass line 52 is advantageously located at the air intake fitting 31 downstream of the air filter. The carrier body 33 is inserted into a reception bore 55 of the wall of the air intake fitting 31 at right angles to the flow direction 2 of the flowing aspirated air in such a manner that the aperture 34 extends in alignment with the bypass line 52 and in this vicinity determines the bypass cross section. In a manner corresponding to the exemplary embodiment shown in FIGS. 2 and 3, the compensating resistor 14 is disposed upstream of the measuring resistor 3 in the exemplary embodiment of FIGS. 4 and 5 as well.

In the exemplary embodiment of FIG. 6, the elements remaining and functioning the same as those already described are again identified by the same reference numerals. Deviating from the foregoing embodiments, the measuring resistor 3 and compensating resistor 14 are here embodied as film resistors. The measuring resistor 3 and compensating resistor 14 are disposed offset from one another in the aperture 34.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An air flow rate meter comprising an electronic regulating circuit and a temperature-dependent measuring resistor including a carrier body arranged for insertion into the intake tube of a manifold, said carrier body having a rectangular aperture provided with surrounding walls to allow air flow therebetween, a compensating resistor being disposed within said aperture on one of said walls, a measuring resistor disposed within said aperture and having terminal end portions being associated with at least two other of said walls, and a reference resistor being disposed circumferentially of said carrier body adjacent said aperture.

2. An air flow rate meter as defined by claim 1, further wherein said carrier body is disposed in said intake tube at right angles to said air flow so as to penetrate a bypass disposed about said intake tube, said aperture thus being aligned with said bypass so as to define a flow cross section thereof.

3. An air flow rate meter as defined by claim 2, further wherein said measuring resistor comprises a wire support on support points disposed on opposite shorter walls of said aperture and further supported at said terminal end portions on support points disposed on opposite longer walls of said aperture, whereby said wire extends substantially in longitudinal alignment with said aperture.

4. An air flow rate meter as defined by claim 2, characterized in that said measuring resistor and said compensating resistor comprise film resistors.

5. An air flow rate meter as defined by claim 4, characterized in that said measuring resistor and said compensating resistor are disposed offset from one another in said aperture.

6. An air flow rate meter as defined by claim 1, further wherein said measuring resistor comprises a wire supported on support points disposed on opposite shorter walls of said aperture and further supported at said terminal end portions on support points disposed on opposite longer walls of said aperture, whereby said wire extends substantially in longitudinal alignment with said aperture.

7. An air flow rate meter as defined by claim 1, characterized in that said measuring resistor and said compensating resistor comprise film resistors.

8. An air flow rate meter as defined by claim 7, characterized in that said measuring resistor and said compensating resistor are disposed offset from one another in said aperture.

* * * * *